United States Patent

Banning, Jr.

[15] 3,679,813

[45] July 25, 1972

[54] CATV TV OR SUBSCRIPTION TELEVISION OPERATIONS

[72] Inventor: Thomas A. Banning, Jr., Chicago, Ill.

[73] Assignee: Frank D. Kenny

[22] Filed: July 29, 1969

[21] Appl. No.: 845,743

Related U.S. Application Data

[63] Continuation-in-part of Ser. Nos. 490,402, Sept. 27, 1965, and Ser. No. 559,494, June 22, 1966, and Ser. No. 645,843, May 19, 1967, and Ser. No. 661,681, Aug. 18, 1967.

[52] U.S. Cl. ..............................178/5.1, 325/308

[51] Int. Cl. ..............................H04n 55/44

[58] Field of Search ..............................178/5.1; 325/308

[56] References Cited

UNITED STATES PATENTS 3,280,249 10/1966 Gargini ..............................178/6 PD 3,365,542 1/1968 Banning, Jr. ..............................178/5.1

FOREIGN PATENTS OR APPLICATIONS 501,913 6/1952 Belgium ..............................178/6 PD

*Primary Examiner*—Benjamin A. Borchelt

*Assistant Examiner*—S. C. Buczinski

[57] ABSTRACT

This application discloses a system of pay or subscription television under which distantly emitted pay or subscription television programs may be received at a local Community Antenna Television Station, also known and hereinafter referred to as a CATV Station, and re-distributed to subscribers connected to such CATV station by non-accessible land lines such as co-axial cables, with provision for requiring pre-payment to be made by the particular subscriber receiver covering the charge made for delivery of such re-distributed program to such subscriber and which pay or subscription system also includes line synchronizing signals. Otherwise stated this application discloses a system of television program distribution and reception combining a pre-pay or subscription television program with distribution thereof by and through a CATV station.

15 Claims, 5 Drawing Figures

Fig.1. Fig.2. Fig.5.

PATENTED JUL 25 1972

3,679,813

SHEET 1 OF 2

Inventor:
Thomas A. Banning, Jr.
Thos. A. Banning Jr.

PATENTED JUL 25 1972 3,679,813

Inventor:
Thomas A. Banning, Jr.
Tho. A. Banning Jr.

CATV TV OR SUBSCRIPTION TELEVISION OPERATIONS

The particular system of Pay TV referred to above is disclosed and covered by various patents of the United States, and applications, as follows: U.S. Pat. Nos. 2,683,769, 2,755,334, 3,070,652, 3,222,452, 3,310,624, 3,330,906, 3,336,439, 3,358,079, 3,365,542, 3,379,825, and 3,435,130; U.S. patent applications as follows; Ser. No. 490,402, filed Sept. 27, 1965, Ser. No. 559,494, filed June 22, 1966, Ser. No. 645,843, filed May 19, 1967, and Ser. No. 661,681, filed Aug. 18, 1967, all such applications being still pending, and the present application being a continuation-in-part of each such pending application.

This application relates to a system of television program distribution and reception operations combined with a CATV system. Otherwise stated, this application discloses a system whereby programs of the Pay TV type may be received by the antenna of a CATV station, and re-distributed to subscribers to such CATV system, for proper pre-pay or subscription operations, thus enlarging the clientele of such CATV system, and making available to such subscribers the superior quality programs being emitted by the originating station. The disclosures hereinafter detailed are such that normal CATV operations of such CATV system may also be continued. Thus the incorporation of the Pay TV programs into the operations of such CATV system does not impair the conventional CATV operations as being presently conducted. Accordingly, the disclosures hereinafter to be detailed, while requiring the addition of certain elements of equipment specially related to the ability of the CATV system to receive and forward such Pay TV programs to the subscriber receivers, with proper translation thereof by the subscriber receivers, does not impair the ability of the CATV system and station to perform its presently conventional functions. Such so added or substituted elements of equipment are of simple and well known form and functions, and are of reliability and dependability in their operations, and widely accepted in the arts to which they are related.

In the following disclosures I have shown provisions for receiving Pay TV programs of one form or kind, and for transmitting such programs to the subscriber receivers, and for translating such programs by the subscriber receivers, but such showings and the specific operations which they perform, are not intended to be a limitation of the protection of my disclosed improvements, except as such limitations may be contained in the claims to follow.

All such patents and applications comprise my inventions in the present field of television and related operations. In the present application I have disclosed structures and operations of Pay TV embodiments which are disclosed in said application, Ser. No. 661,681, as embodied in or combined with, CATV operations, since the operations disclosed in said particular application lend themselves well to such CATV operations, including the transmission of program signals from the CATV station to the subscribers to the particular CATV system, and for other reasons.

All such issued patents and pending applications include various structures and operations relating to a system of Pay TV under which the emittion of a special or pay program is produced in such manner that such program may be received and translated in either an inferior aesthetic quality without pay or charge operation, or with requirement of making a pay or charge operation of minimum amount; or such program may be received and translated in a superior aesthetic quality by making a demanded pay or charge operation, greater than the pay or charge operation demanded for the inferior aesthetic quality translation. Both such inferior aesthetic quality and superior aesthetic quality translations are fully intelligible, as differentiated from so-called scrambled programs presently known to the Pay TV art. Specifically, the system disclosed in such application, Ser. No. 661,681 (and other applications and patents listed above), is one under which the inferior quality translation is a monochrome translation, and the superior quality translation is a color picture translation, it being assumed that the subscriber's receiver is a color receiver of conventional structure.

For purposes of simplicity of disclosure, and for other reasons I shall hereinafter disclose my improvements respecting CATV operations and structures, as applied in the case of a sending or emitting operation including the following features. Under such system, disclosed in said application, Ser. No. 661,681, one of the signal components needed for satisfactory reception and translation in color picture, is not included in the signals being emitted (generally broadcast). Such non-inclusion of such signal which is needed to produce color picture translation results in the translation of the received video signals, translated by the subscriber receiver, including the CATV subscriber receivers, as a monochrome picture translation, but fully intelligible and as perfect as conventional monochrome picture translations. Thus, such translation is to be distinguished from a scrambled picture translation, produced by other well known forms of Pay TV, wherein the scrambled picture produced by non-subscribers or non-payers receivers, is completely unintelligible. The deficiency of such needed signal (for production of the color translation, according to the disclosures of such application, Ser. No. 661,681) in the broadcast program, may then be supplied by supplying such needed signal to the broadcast-received signals, either by a signal generating unit provided for each subscriber receiver, or by wire transmission from the CATV station, when payment or charge operation has been made, by the operator of the particular subscriber receiver. Thus, upon making such payment or charge operation, the subscriber may cause his receiver to translate the received video signals, in color picture rendition. In illustrating and describibg a system of CATV operation which is capable of receiving and forwarding Pay TV programs incorporating the above feature, I do not intend to limit myself to structures and operations incorporting such particular features, except as I may do so in the claims to follow.

I have hereinafter disclosed two embodiments of the particular system of Pay TV above described, when incorporated into a CATV system of operation of conventional form. Under one such disclosures the signal which is non-included in the original emittion of the video signals by the originating station, and received by the high antenna of the CATV station, is the color burst signal. I have hereinafter disclosed an arrangement under which such color burst signal for each subscriber-receiver, is locally generated, properly synchronized with the line synchronizing signals emitted by the originating station, for delivery to such particular subscriber-receiver. I have also disclosed an arrangement under which the color burst signals, properly synchronized with the line synchronizing signals emitted by the originating station is generated at or near the CATV station, and is wired to locations proximate to the several subscriber-receivers, for delivery to each subscriber receiver under control of the receiver operator, and upon complying with pre-pay or charge requirements.

I have also disclosed simple switching facilities for the several subscriber-receivers, and connections controlled thereby, constituted to enable reception of programs striking the antennas of the subscriber-receivers, such as conventional non-pay programs locally broadcast; and for enabling reception of programs, either pay or non-pay, which are received by the CATV station antenna, and are forwarded to the subscriber-receivers, for translation under control by such switching facilities. Such CATV received programs and thus forwarded to the subscriber-receivers may and generally will include conventional broadcast programs, either monochrome or color, from broadcasting stations within the receiving range of such CATV station, as well as Pay TV programs broadcast by stations within such receiving range. Such subscriber-receiver switching facilities are constituted to enable reception of the several categories of programs mentioned above, under either of several operational conditions, including the following;

In a first switching position, any conventional (non-pay) program striking the receiver antenna with sufficient strength to be translatable by such receiver, may be received and translated, with or without payment for such reception, according to the operational conditions prescribed by the CATV system, if such conditions prevail: Second; in the Second switching position, any conventional program received and forwarded by the CATV station, either monochrome or color, may be received and translated by the subscriber-receiver, under its intended quality (either monochrome or color, as the case may be), upon complying with such prepayment or charge operation, as may be demanded by the CATV operation: third; in the third switching position, a Pay TV program received by the CATV station, being a Pay TV program emitted according to the system described previously herein, being without the color burst signal for enabling color picture translation, and thus being translated in monochrome by either a monochrome receiver or a color receiver, with payment of such pre-pay or charge operation as may be demanded, being generally an amount less than will be demanded for translation and rendering such Pay TV program in color: and fourth; in the fourth switching position, such Pay TV program will be translated and rendered in color, provided that the subscriber-receiver be a conventional color receiver, such color translation and rendition being produced upon making the demanded pay or charge amount operation, being assumed to be greater than for the monochrome translation and rendition, produced under the third switching position, the required color burst signal being delivered to such Pay TV program reception by such subscriber-receiver.

The charges demanded for reception of the Pay TV program as above explained, will probably be different for different specific Pay TV programs. Accordingly, I have, in the structures hereinafter described, made provision for delivering to each subscriber a signal indicating the pay amount demanded for the particular program to be or being forwarded; and I have made provision such that the color rendition will be produced only when such required payment or charge operation, has been made.

It is an object of the present invention to make the needed provisions for enabling production of the several operations above stated, as well as other operations which will appear hereinafter, by use of very simple elements and connections, at low cost of production and assembly of such elements, and production of structures of simple form, low cost of such production, and a minimum probability of improper functioning after long service.

Other object and uses of the invention will appear from a detailed description of the same, which consists in the features of construction and operations of parts hereinafter described and claimed.

In the drawings:

FIG. 1 shows schematically and in simple form, the embodiment wherein each particular subscriber receiver is provided with its color burst generator, together with connections needed to deliver such color bursts to the receiver when the superior quality video translation is desired and paid for; the program signals being delivered from the CATV station to locations proximate to the subscriber receivers; this embodiment requiring no provision for wire conductor transmission from the CATV station to such receiver, other than such non-accessible cable lines as are conventionally used for CATV operations at the present time;

FIG. 2 shows schematically, and in simple form, the embodiment wherein the CATV station is provided with a color burst signal generator supplying the color burst signals to a wire line extending to locations proximate to the subscriber receivers; the switching facility of each subscriber receiver being provided with means and connections for delivery of such bulk generated color burst signals to such receiver under proper subscriber control of payment or charge operation and this figure also shows an alternate arrangement whereby the color burst signals may be generated at the program originating station and may be sent by non-accessible land wire line to the CATV station, and sent thence to locations proximate to the CATV subscribers' receivers.

Figures 1, 2, 5:
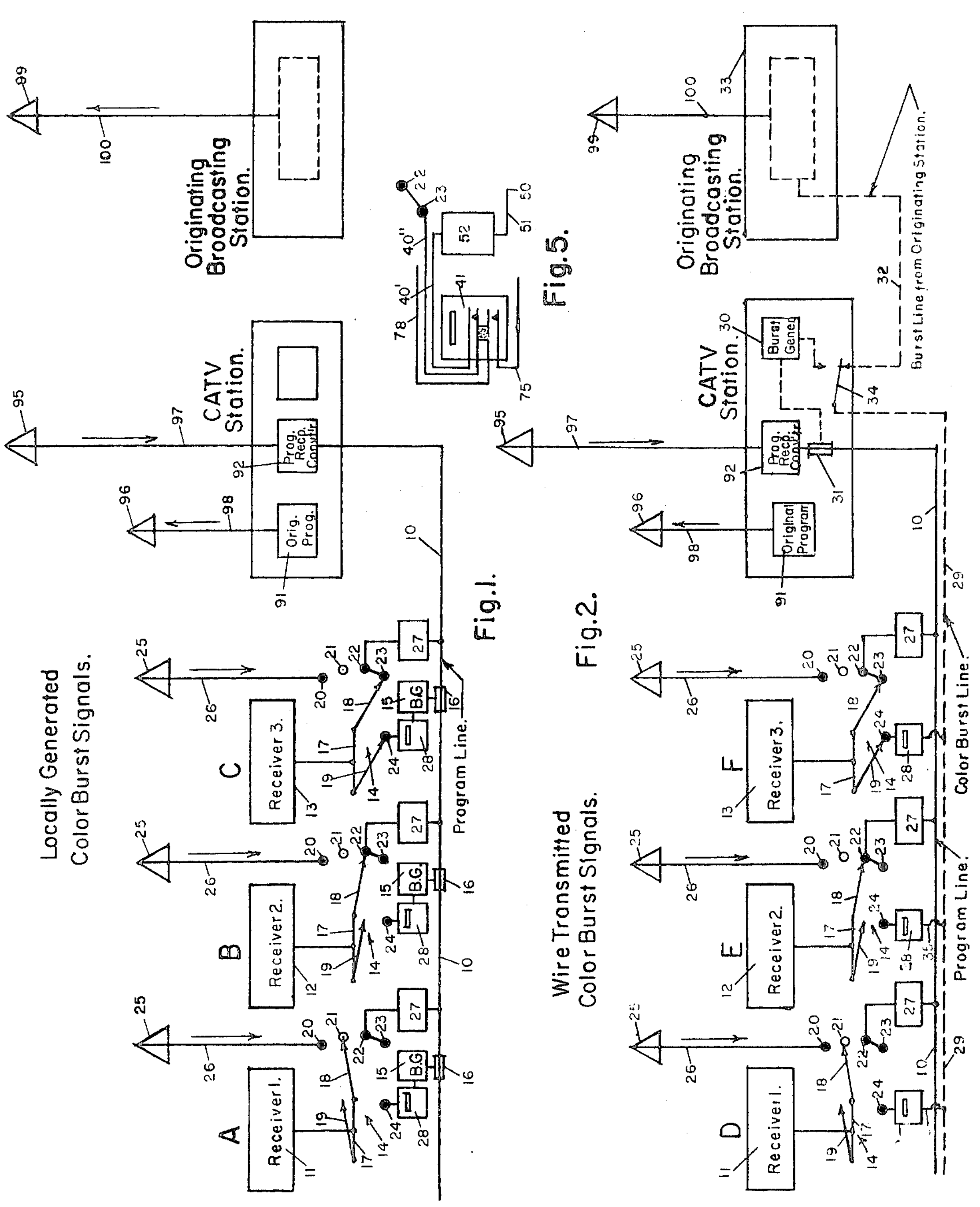
FIG. 5 shows a fragmentary portion of the coin or token units disclosed in FIGS. 3 and 4, but of modified disclosure by which one of the coin or token units shown in such FIGS. 3 and 4 may be dispensed with, for simplification of the receiver-supplemental unit.
Figures 3, 4:
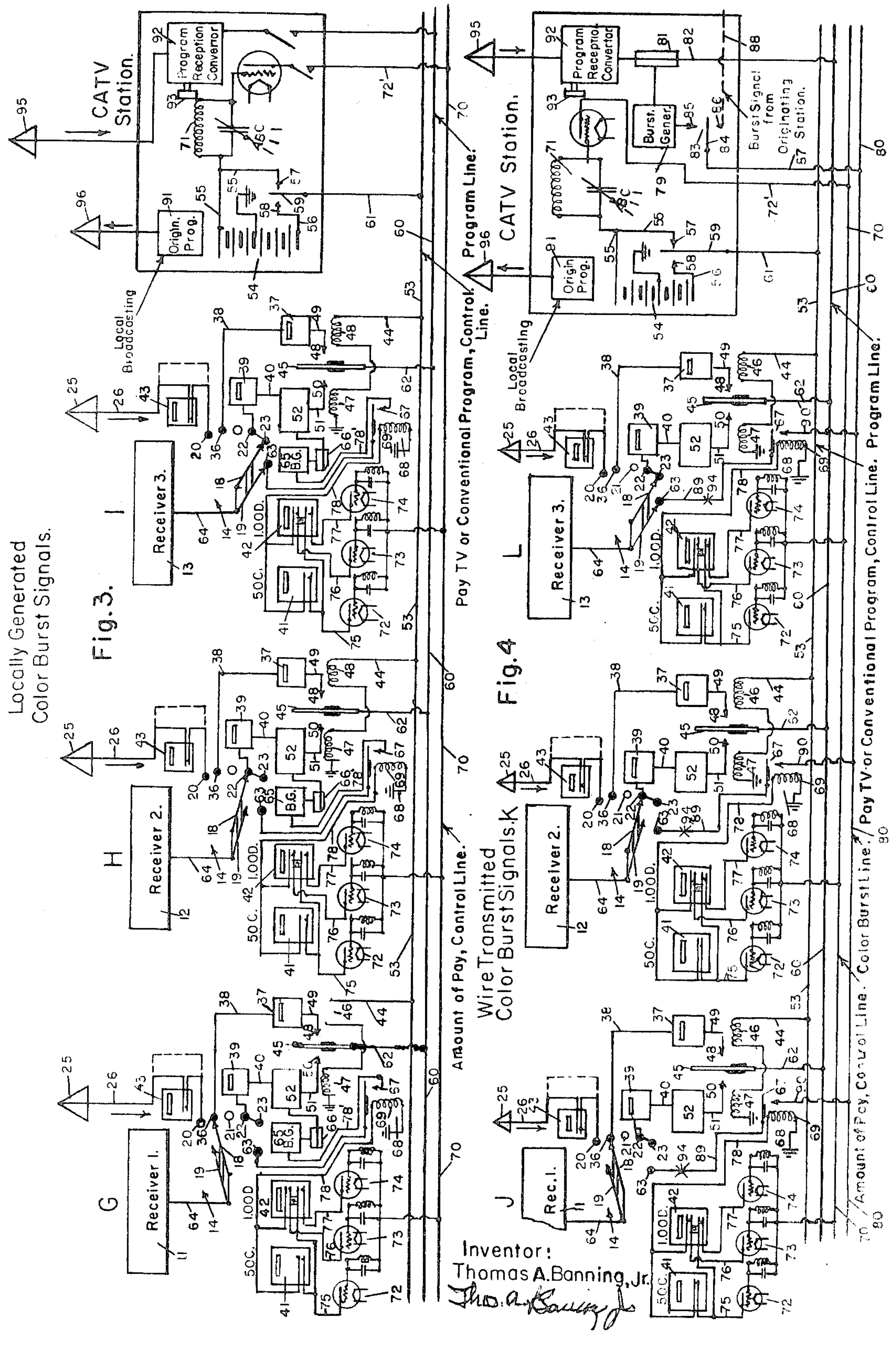
FIG. 3 shows schematically, but in greater detail an embodiment including the basic features disclosed in FIG. 1.
FIG. 4 shows schematically, but in greater detail an embodiment including the basic features disclosed in the showing of FIG. 2.

Referring first to FIG. 1, I have therein shown an embodiment wherein the color video signals emitted by a parent originating station without inclusion of the color burst signals, are received by the high antenna of the CATV station, and by that station are conditioned if need be, and forwarded over the non-accessible program carrying line 10, to locations proximate to the several subscriber-receivers 11, 12 and 13. Each such subscriber-receiver is provided with a receiver supplemental unit 14. Since all of the subscriber-receiver supplemental units are identical structures and units, I shall identify like parts and elements by like numerals, it being noted that the various subscriber receivers of FIG. 1 are identified as A, B and C, of FIG. 2 are identified as D, E, and F, of FIG. 3 are identified as G, H, and I, and of FIG. 4 are identified as J, K, and L, respectively.

Each supplemental unit includes a color burst generator 15 which is connected to the program line 10 by the corresponding inductive unit 16. Such unit 16 receives by induction, the line synchronizing signals comprising a portion of the video program, and delivers such synchronizing signals to the corresponding color burst unit under burst flag generator and burst keyer control as needed. By this arrangement such locally generated color burst signals are delivered to the color burst unit in condition for delivery to and incorporation into the program signals derived from the program line 10. In my said pending application, Ser. No. 661,681, I have disclosed schematically, a color burst generator and connections for delivery of the synchronizing signals thereto, according to the operations above stated. Such an arrangement may also be used in the showings of this application.

Each of the supplemental unis includes a switching unit 17 having the two blades 18 and 19 which are moved in fixed phase relationship during switching operations. Such switching units and blades are shown for convenience in FIG. 1 in three different switching positions at the three illustrated receivers. The blade 18 sweeps successively into contact with the four stationary contacts 20, 21, 22, and 23 during a movement in a given direction. The blade 19 engages only the stationary contact 24 at the final moved position of the blades. In the illustrated embodiment contact 20 connects to the receiver antenna 25 by the line 26, contact 21 is the Off position of the switching facility, contact 22 connects to the program signal receiving unit 27, and contact 23 also connects to such unit 27 by being connected to or a continuation of the contact 22. These contacts are all located in the sweep path of the blade 18. The contact 24 connects to a coin or token receiving unit 28 which receives the color burst signals from the color burst generator 15, and transmits such signals to the contact 24, only when the demanded pre-payment has been made, producing closing of the contacts of such unit 28. Thus, at the final contact position of the switch blade carrier unit 17, both of the blades 18 and 19 are engaged with the two contacts 23 and 24, respectively, for delivery of the forwarded color program received by the CATV high antenna, and the locally generated color burst signals.

If the subscriber so desires he may stop movement of the switch element at the point of engagement of the blade 18 with the contact 22, thus obtaining monochrome picture rendition without need of making the full pre-payment needed for color rendition of the program. Such pause at this position will enable him to determine whether he desires to receive the video program in color, or will be satisfied with the monochrome reception.

The operations thus described require no special additional equipment at the CATV station, other than simple switching gear; and such operations may be made available without need of providing non-accessible transmission lines, other than such lines as are being conventionally provided and used at the present time for CATV operations.

The arrangement shown schematically in FIG. 2 is similar to that shown in FIG. 1, with the exception that a line 29 supplemental to the program carrying line 10, is provided, extending from the CATV station to the several subscriber receivers, with provision of a single color burst generator located at the CATV station and supplying the color burst signals to such line 29 in properly synchronized condition with respect to the main program signals carried by the line 10. Accordingly, the color burst generator 30 is provided at the CATV station, together with an inductive unit 31 in proper relation to such main program line, to deliver the synchronizing signals to the color burst generator over the line. Additionally, in this Figure, I have also shown a modification as follows:

A non-accessible land line 32 is shown extending from the originating station 33 to the CATV station, and delivering color burst signals generated at such originating station, to such CATV station. The two position switch 34 is provided at the CATV station, in connection with the color burst line 29, the CATV color burst generator 30, and such land line 32, constituted to enable delivery of color burst signals to the line 29, from either the locally produced color burst signals generator of the CATV station, or generated at the originating station, and brought to the CATV station by land line. The desirability of delivering such color burst signals from the originating station, to the CATV station by land line as distinguished from generating such color burst signals locally at the CATV station, might depend on the presence or absence of local interference requiring correction in the one case more than in the other case. In either case, the color burst signals are thus delivered over land line to the subscription receivers from the CATV station in question.

The line 29 (of FIG. 2), extends to locations proximate to the several subscription receivers being served. At each such receiver the receiver supplemental unit includes the connection and unit 27 delivering color video program signals to the stationary contact 22 of the switching facility 14, which switching facility includes the two blades 18 and 19, corresponding to like blades of the showing of FIG. 1.

A pre-pay coin or token unit 28 is provided for the receiver, such unit being located in the line 35 which connects the color burst land line to the stationary contact 24, corresponding to a like contact 24 of the showing of FIG. 1. Accordingly, when the switching facility 14 is moved to its lowermost position, to bring the blade 19 into engagement with the contact 24, and the blade 18 into engagement with the stationary contact 22, both the video program signals and the corresponding color burst signals, will be delivered to the receiver, producing color picture translation, provided that the proper amount and value of coins or tokens has been inserted into the coin or token box 28.

Detailed description of the units corresponding to the receivers 1, 2, and 3, of FIG. 1, and corresponding to the receivers 1, 2, and 3, of FIG. 2 is unnecessary since each of such receivers and the corresponding switching facilities and units and connections for such receivers are the same as described in the showing of FIG. 1, or the showing of FIG. 2, and like parts have already been described in the descriptions of FIGS. 1 and 2.

The following operations are possible with the structures of either of the embodiments shown in FIGS. 1 and 2:

First: With the switching facility in contact position 21, no program reception is available.

Second: With the switching facility in contact position 20, broadcast reception is available, for either monochrome or color programs broadcast under conventional conditions, that is, including the color burst signals for such color program. If the reception conditions are such that the subscriber's antenna is able to receive distant programs emitted as Pay TV programs but without inclusion of the color burst signals, then such subscriber-receiver will receive and translate such antenna received color program, but in monochrome instead of color picture reception, and without pay or charge for such reception.

Third: With the switching facility in contact position 22, a CATV delivered program will be received in conventional program reception if the CATV station is at the time receiving and forwarding conventional programs touching its antenna with sufficient strength or strength amplified at such CATV station, according to conventional operations; and if such so received and forwarded programs are in color conventional signals, including the color burst signals, then such subscriber receiver, having its switching facility contacts engaged with the stationary contact 22 as before assumed, will translate such color conventional program in color, and without pay (other than such service charge as may be conventionally demanded for the CATV service). If the so-received color program is a Pay TV program embodying the feature of non-inclusion of the color burst signals, then with the switching facility in such stationary contact 22 position, the subscriber-receiver will translate such so-received Pay TV program in monochrome translation, and without charge or payment, other than such service charge as may be demanded by the CATV system of operations.

Fourth: with the switching facility in contact position 23, the Pay TV programs originating at the Originating Broadcasting Station will still be forwarded to the switching facility in question as explained under "Third"; but additionally the switching facility blade 19 will engage the stationary contact 23, thus enabling delivery of the color burst signals received from the generator 15 of FIG. 1, or received directly from the non-accessible line 29 of FIG. 2, as the case may be. In either of such cases (FIG. 1 or FIG. 2), delivery of the color burst signals for production of the Pay TV program rendition in color, will occur only when proper charge operation or payment has been made, as by coin or token delivery into the unit 28.

I next refer to the showings of FIGS. 3 and 4. These showings are also largely schematic, but in greater detail than their counterparts, FIGS. 1 and 2, respectively. Certain of the elements and units shown in FIGS. 1 and 2 are repeated in corresponding FIGS. 3 and 4, for the several subscriber-receivers, and elements or units of FIGS. 3 and 4, which correspond to elements or units of FIGS. 1 and 2, are identified by like numerals, for purposes of simplicity of understanding and otherwise. Accordingly, the showing of FIG. 3 is one under which the color burst signals are locally generated for each subscriber-receiver when proper operations have been performed; and the showing of FIG. 4 is one under which the color burst signals are delivered over land line, in bulk, to locations in proximity to subscriber-receivers, and from such land line, they are delivered to the several subscriber-receivers, under operator control, and when proper charge or pre-payment has been made. It is noted that under this arrangement, the color burst signals may be generated in bulk at the CATV station, proper synchronism of the burst flag generator and the burst keyer being produced by inductive transfer from the line synchronizing signals carried by the program being received by the high antenna of the CATV station. Alternatively, such color burst signals may be generated at the originating station from which the program is being broadcast, such color burst signals then being transmitted by land line to the CATV station, and thence forwarded to the subscriber-receiver locations.

Under a possible conventional CATV operation, provision is made for pay requirement for delivery of each program forwarded by the CATV station, and delivered to the subscriber-receiver. Such charge is conventionally made in addition to a periodical charge, usually of small amount, based on installation and up-keep costs, and for service connection to the CATV system and cables. Such payment for each forwarded and received program, will be herein conveniently referred to as a "conventional program" payment. When the CATV system also includes provision for receiving by its high antenna, "Pay TV" programs, as to which program-charges are made against subscribers to such Pay TV system, and when such CATV system forwards such "Pay TV" program to its CATV subscribers, provision should be made for pre-payment (or charge operation) for the delivery of each such Pay TV program, thus forwarded and delivered to such CATV system subscriber, and rendered in intelligible translation to the CATV subscriber. Such program charge or payment would probably be of greater amount than required for delivery of a "conventional"program, previously referred to herein.

When the Pay TV system is one under which the Pay TV color program is broadcast without the color bursts, thus causing rendition of the broadcast program in monochrome instead of color, provision may be made in the CATV subscriber-receiver supplementary unit for requiring the particular CATV subscriber to make a "minimum" program charge or payment for such intelligible rendition of the Pay TV program, and for requiring such CATV subscriber to make a higher program charge or payment for the intelligible rendition of such Pay TV program in color. Such Pay TV charges or payments being for the particular program and rendition, and additional to monthly service charges made by the CATV system against its subscribers.

All such program charges or payments may, for convenience x be identified as follows:

First: Program charge for conventional program received and forwarded by the CATV station, being either a monochrome or a color program.

Second: Program charge for Pay TV program received in monochrome instead of color translation.

Third: Program charge for Pay TV program received in color instead of monochrome.

Additionally, I have in each of FIGS. 1, 2, 3, and 4, shown a switching position whereby the antenna of the subscriber-receiver may be connected directly to the receiver r.f. input element, to thus directly receive broadcast programs of either monochrome or color originations. In FIGS. 3 and 4 I have also shown pre-pay or charge units interposed in such antenna connections, thus requiring payment of a small charge for receiving each such direct antenna program, if such charge be demanded. I have shown by dashed lines alternative jumper connections bypassing such pre-pay charge units, if such units are not desired or required.

It is next noted that one of the stationary contacts 20, of the switching facility is assigned for the direct antenna reception operation; that two of such contacts 22 and 23 (FIGS. 3 and 4) are assigned to the Pay TV reception operation, and that a contact 36 is assigned to the switching facility, for engagement when a conventional program (non-Pay TV), either monochrome or color, is being forwarded by the CATV station, to the receivers. The coin or token unit 37 is included in the line 38 feeding such contact 36. Also that the coin or token unit 39 is included in the line 40 feeding both of the contacts 22 and 23. The two coin or token units 41 and 42 are provided for use when a Pay TV program is to be translated in color (by inclusion of the color burst signal in the program signals for such color translation), and such units 41 and 42 will be described and their functions explained in detail hereinafter.

From the structures thus far described, provision has been made for different charge or pay amounts for direct antenna reception, for reception of conventional programs either monochrome or color, for Pay TV programs in monochrome, and for Pay TV programs in color. For various reasons it is desirable to separate the program receptions for conventional (non-Pay TV) programs from reception of the Pay TV programs in monochrome (and in color). Such separation is produced by the supplemental switching unit 44 shown in FIGS. 3 and 4. This includes the polar relay unit having the polar tongue 45 in position for drive rightwardly by current of one polarity supplied to the magnets 46 and 47, connected in series, with one end grounded as shown, so that current of one polarity will drive such tongue rightwardly, whereas current of reversed polarity will drive such tongue leftwardly, the tongue normally standing in its central or non-shifted position, to which it may be returned when no current flow occurs through the magnets. Such normally biased, non-engaging condition may be produced by springs or by biasing the leaf spring which carries the tongue into the central position as shown. When driven rightwardly by proper polar current, such tongue engages the contact 48 which leads by the line 49 to the pre-pay unit 37, for supply of program signals to the contact 36, corresponding to reception of conventional (non-Pay TV) programs; when driven leftwardly by reverse polar current, such tongue engages the contact 50 which leads by the line 51 to the unit 52 which delivers the color program (minus the color burst signals) to the line 40 leading to the pre-pay unit 39 which connects to the two contacts 22 and 23 of the switching facility. Thus, Pay TV program signals (minus the color burst signals) are delivered to such two contacts 22 and 23 when the polar relay is shifted leftwardly, as explained. Accordingly, under such polar relay operation, and with the switching facility shifted to cause engagement of the blade 18 with either of the contacts 22 or 23, Pay TV programs will be delivered to the corresponding receiver.

Under the condition of engagement of such blade 18 with the contact 22, the blade 19 remains un-engaged with any stationary contact. Thus, at such position of the switching facility, only the Pay TV program signals minus the color burst signals, will be delivered to the receiver, with corresponding translation of such Pay TV programs in monochrome instead of color.

The line 44 which supplies the magnets of the polar relay connects to the control line 53 legended "Pay TV or Conventional Program, Control Line." Such control line extends from the CATV station to locations proximate to all subscriber receivers intended to be served thereby. The CATV station is provided with d.c. supply means and switching means constituted to deliver either positive or negative polarity current to such control line 53. The illustrated arrangement includes the battery 54, having its central point grounded as shown, and its positive and negative terminals connected by the lines 55 and 56 to the two contacts 57 and 58, between which the contact 59 may be shifted by the CATV station attendant. When shifted in one direction the polar relay of each connected subscriber-receiver will be shifted to cause delivery of program signals to the conventional program contact 36 (through the contact 48, and lines 49 and 38), provided the pre-pay unit 37 has been satisfied; when shifted in the opposite direction (of the CATV station switch unit 59), the polar relay of each such connected subscriber-receiver will be shifted to cause delivery of program signals to the Pay TV contacts 22 and 23, provided the pre-pay unit 39 has been satisfied. The contact 59 connects to the line 53 legended Pay TV or Conventional Program, Control Line, by the line 61, and such control line 53 connects to each of the subscriber-receiver polar relay contacts by a line 62.

Under the foregoing arrangement a single non-accessible land line may be used for alternatively delivering signals corresponding to either of two classes of program, to the CATV subscriber-receivers, by merely reversing the polarity of the current delivered over the control line 53. Such an arrangement is also disclosed in my application, Ser. No. 645,843, of which case the present application is a continuation-in-part. When the two different classes of programs include either conventional non-pay programs, and Pay TV programs, as to which charges are demanded, different treatments of the signals for such two classes of programs are required when such different classes of program signals are received at the subscriber-receiver. Accordingly, the isolation of such different classes of signals from each other at the subscriber-receiver, are necessary. Such isolation of the two classes of signals is also needed due to the fact that the Pay TV program signals are to be translated either in monochrome or in color, as already explained. Such isolation of the two classes of signals from each other is also required by the fact that payments for the different classes of programs differ, due to which fact I have provided two different coin or token boxes for the two classes, being the coin-boxes 37, for payment, if demanded for reception of conventional program signals, and 39 for reception of the Pay TV programs in monochrome, being the inferior aesthetic quality translation. The additional coin or token boxes 41 and 42 have been provided for payments for the color reception of Pay TV programs as to which different charges are to be made.

In my earlier application, Ser. No. 661,681, I have disclosed arrangements for delivering the color burst signals to the subscriber-receivers either by color burst generating units corresponding to and located proximate to, the respective subscriber-receivers, or by generating such color burst signals at the sending station, and transmitting them by non-accessible land line to locations proximate to the subscriber-receivers, together with control means to deliver such signals to the individual receivers, as desired under subscriber control. In the present application I have made and disclosed units and connections corresponding to such two systems, being FIGS. 1 and 3, for arrangements wherein the color burst signals are generated individually for the respective receivers, and FIGS. 2 and 4, wherein the color burst signals are generated or transmitted from the CATV station in bulk, to locations proximate to the respective subscriber-receivers, with provision for delivering such signals to the receivers of subscribers who desire to receive the superior quality rendition of the program under corresponding amount of pay or charge.

Referring to FIG. 3, the switching facility 14 for each receiver includes the two blades 18 and 19. The blade 18 engages the contacts 20, 36, 22, and 23, as already explained. The blade 19 engages only the contact 63, and makes such engagement only at the finally moved position of the switching facility. A line from the receiver-supplemental unit 52, which line carries received signals of the program, including the line synchronizing signals, is provided with an induction unit 66 by which the line synchronizing signals are carried to the color burst generator 65, which generates the color burst signals in synchronism and proper phase with respect to the video and other program signals, being received by the receiver supplemental unit, so that such so-generated color burst signals may be transmitted to the radio frequency input element of the receiver for producing color raster production of the video signals, by such receiver. Such delivery of the locally generated color burst signals is under control of pay coin or token units, 41 and 42, (by way of example), which units must be satisfied in order to produce transmission of the locally generated color burst signals, to the receiver. Two of the coin or token units are illustrated, marked "50 C." and "1.00D," respectively, indicating the need of depositing 50 cent coins in the one, and 1 dollar coins in the other. By such simple arrangement provision is made for charges of 50 cents, 1 dollar, and $1.50, as notified by the attendant at the CATV station, as will be explained hereinafter. Such an arrangement is also shown in my application Ser. No. 661,681. Provision is made for delivering a super-sonic frequency signal from the CATV station to each of the subscriber-receiver units, the frequency of which signal is indicative of the amount of charge to be prepaid into the units 41 and 42, in order to permit delivery of the locally generated (or locally delivered) color burst signals, to the subscriber-receiver. All such arrangements are as follows:

In FIG. 3 there is provided the line 70 extending from the CATV station to locations proximate to the receivers to be served. This line is legended "Amount of Pay, Control Line." At the CATV station there is provided the variable frequency oscillator unit 71; as shown this unit may deliver a selected one of three frequencies, e.g., 45,000 c.p.s., or 50,000 c.p.s., or 55,000 c.p.s. The selected frequency is delivered to the line 70 by a connection 72'. The three frequency response units 72, 73, and 74 are provided in the receiver-supplemental unit, tuned to respond individually to such frequencies when emitted by the CATV station. To this end, the unit 72 responds to a 45,000 c.p.s. frequency, the unit 73 responds to a 50,000 c.p.s. frequency, and the unit 74 responds to a 55,000 c.p.s. frequency. Such units 72, 73, and 74 deliver their response frequency signals to the pay units 41 and/or 42 by connections such that for a 50-cent charge, only the unit 41 needs satisfying, for a 1-dollar charge, only the unit 42 needs satisfying, and for a charge of $1.50, both units 41 and 42 must be satisfied. The circuitry by which the foregoing operations are provided, is described in detail in my said application, Ser. No. 661,681, and such circuitry is shown proximate to the receiver units of FIGS. 3 and 4.

In the showing of FIG. 3, I have included a relay 68. The solenoid 69 of such relay is energized by current delivered over the line 78 from the units 41 and/or 42. Whenever current is delivered to such line 78 by satisfying the demanded amount of pay, the contacts 67 of such relay close. Such contacts comprise a portion of a line 78' for delivery of the color burst signals from the generator 65 to the stationary contact 63. Accordingly, whenever the demanded amount of pay has been inserted into the units 41 and/or 42, the color burst signal contact 63 will be electrified for delivery of such signals. As previously explained herein, when the switching facility is shifted to the final position, the blade 19 engages such contact 63. Both of the blades 18 and 19 connect to the line 64 which leads to the r.f. input element of the receiver. Accordingly, under the stated condition that the demanded amount of pay for rendition of the Pay TV program in color, has been made, both the video signals of such program, and the color burst signals needed for color rendition, are delivered to the receiver, producing the desired color picture rendition.

In the showing of FIG. 4 I have substituted the CATV bulk generation of the color burst signals, in place of the individual receiver generation of such signals. Accordingly, such showing of FIG. 4 includes the color burst generator 79 located at the CATV station, and constituted to deliver the color bursts to the "Color Burst Line" 80 which extends to locations proximate to the several subscriber-receivers to be served. Such color burst generator is connected to the induction unit 81, proximate to the program carrying line 82 by which the programs are delivered, such arrangement serving to deliver line synchronizing signals to the color burst generator, for causing delivery of such burst signals in proper phase and synchronism with respect to the line synchronizing signals of the program being delivered. In FIG. 4 I have shown an arrangement and structure whereby the color burst signals may be delivered by the originating station, to the CATV station, by land line, and whereby such so-received color burst signals may be supplied to the Color Burst Line 80. Accordingly, I have shown the two position switch 83 whose movable contact 84 may be engaged with either the contact 85 or the contact 86 selectively, such contact 84 connecting to the Color Burst Line, by the line 87. The contact 85 connects to the bulk color burst generator 79, and the contact 86 connects to the land line 88 which, when provided, transmits color burst signals from the originating station to the CATV station. Accordingly, the color bursts which are delivered to the line 80 may be of origin at the CATV station, or may be of origin at the broadcasting station of which the Pay TV program signals are derived.

Under this CATV color burst bulk generating, or color burst bulk forwarding system, provision must be made for delivering the color bursts from the line 80 to selected subscriber-receivers, for rendition of the Pay TV program in color, when proper pay or subscription operation has been made. To this end, the relay 68 is retained, including the connections 78 whereby the relay contacts 67 are closed when proper pre-pay has been made; but the line 89 leading from the top contact of such relay connects to the contact 63 by which the color burst signals are transferred to the r.f. input element of the subscriber-receiver, and receives its color burst signals, when the relay is closed, from the line 90 which connects to the Color Burst Line 80, instead of from a color burst generator individual to the specific subscriber-receiver. Accordingly, upon making proper pre-pay, and with the switching facility in position to engage the blade 19 with the contact 63, delivery of the color bursts to the r.f. input element of the receiver will occur.

Reference has been made to the provision of the contact 20 of the switching facility, which contact is connected to the subscriber-receiver antenna 25, by the line 26, which line may include the pre-pay unit 43. When the receiver is switched to position of engagement with such contact 20 reception can be had of any program then on the air, and of strength sufficient to produce satisfactory reception. Generally such reception will be from local sending stations; but in any case it is reception which does not come through the facilities of the CATV station. In this connection, however, one such local broadcasting station may be the CATV station itself, when provided with needed equipment for broadcasting either in monochrome or in color, or both. The antenna 96 may be used for such local original broadcasting by the CATV station, from the conventional equipment indicated by the unit 91 in each of FIGS. 1, 2, 3, and 4.

When the CATV station is provided with equipment constituted to receive all programs which may be on the air at a given time (and within the full available range of carrier frequencies established by the F.C.C.), such reception being provided by the unit 92 shown in FIGS. 1, 2, 3, and 4, all such programs so received by the high antenna of the CATV station may be forwarded to the subscriber-receivers, thus allowing each such receiver to produce rendition of any selected program thus available. If the unit 92 of the CATV station is provided with selecting means 93, constituted to select one of several arriving programs striking its high antenna 95, with provision for delivering only such selected program to the Program Line 60, it is evident that only such selected program will be delivered to the line 60 leading to the subscriber receivers. Accordingly, under such operational conditions a subscriber-receiver must tune his receiver to the frequency of such arriving program in order to gain reception from the line 60.

The lines extending from the CATV station to the various subscriber-receiver locations may conventionally be co-axial, according to conventional practice. In case slight displacements of phase between the luminance and chrominance components of a color program delivered to a subscriber-receiver, and the color bursts delivered to such receiver, should occur when using the structural embodiment of FIG. 4 (it being noted that under the operations of that embodiment such color bursts are delivered over such length of cable as is needed between the CATV station and such particular receiver) correction of such phase displacement may be produced by the unit 94 shown by the X in each of the lines 89 of such FIG. 4. For convenient reference the CATV station antennas are numbered 95, for the high antenna which receives programs from distant originating station, and 96, for the local broadcasting of locally produced programs as previously referred to herein.

In each of FIGS. 3 and 4, there are included four pre-pay units for each subscriber-receiver, being the unit 43 for the subscriber-receiver, the unit 37 for non-Pay TV programs forwarded by the CATV station, the unit 39 for monochrome renditions of Pay TV programs forwarded by the CATV station, and the unit 41–42, comprising generally two coin boxes for different coin value insertions, for color renditions of Pay TV programs forwarded by the CATV station. Various forms of such pre-pay units are available, suitable for the instant uses. However, in FIG. 5, I have shown in fragmentary form a portion of the circuitry of the embodiment shown in FIG. 4, being a modification whereby the unit 39 may be dispensed with, being the pre-pay unit for payment for monochrome renditions of the Pay TV program, the pre-pay unit 41 being provided with a second pair of contacts, in substitution for the contacts of such non-used unit 39, whereby, when monochrome reception of the Pre pay TV program is desired, coin insertion into such unit 41 will produce the desired circuitry for such monochrome rendition. Usually such unit 41 will be specified for the smallest coin to be used (e.g., 50 cents) which might also be the pre-pay amount for the monochrome rendition of the Pay TV program; such monochrome rendition then being available by deposit of only such minimum value coin into such unit 41. The circuitry shown in FIG. 5 will be understood by comparison of like numbered elements and lines of FIGS. 4 and 5. Having made deposit of such minimum value coin into the unit 41, further deposits in the unit 42 (and possibly other units) may be made if the subscriber decides to receive the color rendition by needed further coin deposits.

The following comments respecting operational features are pertinent:

In FIGS. 3 and 4, when the polar relay is activated to throw its contact 45 leftwardly to engage the contact 50, a conventional (non-Pay TV) program, either monochrome or conventional color (non-Pay TV), including the color burst signals), may be transmitted from such contact 50, through the unit 52, and the coin or token unit 39, to the contact 22 (and the contact 23); such conventional program may then be tuned by the receiver, and translated, (when the switching facility is moved to position of engagement of its blade 18 with such contact 22). When the switching facility has been thus moved it is evident that the demanded pre-pay for either the conventional monochrome or conventional color rendition, or for the monochrome rendition of the Pay TV program (if present and tuned), will all be of the same amount, namely, that demanded by the unit 39. The provision of the polar relay with its additional rightward contact 48, makes it possible to produce an operational system under which the charge for the monochrome rendition of the Pay TV program may be different from the charge demanded for the other program renditions as above explained.

Nevertheless, if operational conditions and decisions make possible operations under which the charge for monochrome rendition of the Pay TV program is the same as the charges for other classes of renditions, as above explained, such polar relay may be dispensed with, thus also dispensing with various other elements of equipment, including the pay unit 37, the contact 36 of the switching facility, the land line 53 by which the "Pay TV or Conventional Program, Control Line" signals are transmitted, and the control switch 59 at the CATV station. The foregoing comments are proper as respects the structures and operations of both embodiments shown in FIGS. 3 and 4.

I claim:

1. In a CATV television system which includes line synchronizing signals a CATV station having a program signal receiving antenna and means in connection with said antenna to receive and deliver television program signals broadcast from an originating station and sensed by said antenna, wherein the program signals sensed by said antenna include color translatable signal components with exclusion of the color receiver color translation producing signal, and which system includes a CATV subscriber-receiving-receiver and includes a non-accessible wire line extending between the CATV station and such subscriber-receiving-receiver constituted to deliver the so-received color component signals from the CATV station to such subscriber-receiving-receiver; that improvement which includes means to deliver color receiver color translation producing signals to such subscriber-receiving-receiver in synchronism with the line synchronizing signals of the color translatable video signal components which are received by the CATV subscriber-receiving-receiver.

2. A CATV system as defined in claim 1; wherein the means to deliver the color receiver color translation producing signals to the subscriber-receiving-receiver include color translation producing signal generating means, together with means to synchronize such color translation producing signals with the line synchronizing signals of the color translatable video signal components, and synchronizing-signal transmitting connections between such color translation producing signals generating means and the wire line means which delivers the color translatable signal components to the subscriber-receiving-receiver.

3. A CATV system as defined in claim 2; wherein said connections between the color translation producing signal generating means and the wire line means, includes induction means in connection with the wire line means.

4. A CATV system as defined in claim 2; wherein the color translation producing signal generating means is located in proximity to the subscription receiving-receiver, together with means to deliver such so-generated color translation producing signals to such receiver.

5. A CATV system as defined in claim 4; wherein the means to deliver the so-generated color translation producing signals to the receiver, includes pre-pay or subscription means.

6. A CATV system as defined in claim 2; wherein the color translation producing signal generating means is located in proximity to the CATV station, together with a non-accessible wire line connection between such color translation producing signal generating means and the subscriber-receiving-receiver.

7. A CATV system as defined in claim 6; wherein the non-accessible wire line connection includes pre-pay or subscription means.

8. A CATV system as defined in claim 2; wherein the color translation producing signal generating means is located at the originating program emitting station, and wherein the means to deliver the color translation producing signals to the subscriber-receiving-receiver, includes non-accessible wire line means extending between the originating program station and the subscriber-receiving-receiver.

9. A CATV system as defined in claim 8; wherein the non-accessible wire line means which extends between the originating program station and the subscriber-receiving-receiver includes a wire line extending between the originating program station and the CATV station, and includes a wire line extending between the CATV station and the subscriber-receiving-receiver.

10. A CATV system as defined in claim 1; wherein the color translation producing signal comprises a burst signal.

11. In a CATV television system which includes line synchronizing signals a CATV station having a signal receiving antenna and means in connection with said antenna to receive and deliver the television program signals broadcast from an originating station and sensed by said antenna, wherein the sensed program signals received by said antenna include luminance component signals, line synchronizing signals, and chrominance excluding color burst signals, and which system includes a CATV subscriber-receiving-receiver and includes a non-accessible wire line extending between the CATV station and such subscriber-receiving-receiver constituted to deliver the so-received luminance component signals, the line synchronizing signals, and the chrominance signals, from the CATV station to such subscriber-receiving-receiver; that improvement which includes means to generate color burst signals in synchronism with the line synchronizing signals and to deliver such so-generated color burst signals into the receiver in synchronous relation to the line synchronizing signals.

12. A CATV system as defined in claim 11; wherein the means to deliver the color burst signals into the receiver, includes operator controlled means to cause delivery or non-delivery of the color burst signals into the receiver, selectively.

13. A CATV system as defined in claim 12; wherein the means to cause delivery or non-delivery of the color burst signals into the receiver, includes operator controlled pay or subscription means.

14. In a CATV system which includes a CATV station having a signal receiving antenna and means in connection with said antenna to receive and deliver the television signals broadcast from an originating station and sensed by said antenna, wherein the so-sensed program signals alone, received by said antenna include color video signals receivable and translatable in a color receiver as a monochrome picture rendition, and which system includes a CATV subscriber-receiving-receiver and includes a non-accessible wire line extending between the CATV station and such subscriber-receiving-receiver constituted to deliver such program signals to such receiver, with production of a picture raster in monochrome by said receiver; that improvement which includes means to deliver a supplemental color burst signal to the receiver, constituted to cause the receiver to produce the picture raster in color rendition.

15. A CATV system as defined in claim 14; wherein the broadcast and antenna received signals include luminance signals and chrominance signals and line synchronizing signals of a color television program, and wherein the supplemental signal delivered to such subscriber-receiving-receiver comprises a color burst signal in synchronism with the line synchronizing signals delivered to such subscriber-receiving-receiver.

* * * * *